(12) United States Patent
Helbling et al.

(10) Patent No.: US 8,130,917 B2
(45) Date of Patent: Mar. 6, 2012

(54) METHOD AND APPARATUS FOR GROUP MESSAGING

(75) Inventors: Christopher L. Helbling, Norwalk, CT (US); Craig L. Reding, Midland Park, NJ (US); Ashutosh Sureka, Irving, TX (US); Paula Dromlewiez, Holden, MA (US); Sandeep Chakravarty, Dallas, TX (US); John Reformato, Tarrytown, NY (US)

(73) Assignees: Verizon Data Services LLC, Temple Terrace, FL (US); Verizon Services Corp., Ashburn, VA (US)

( * ) Notice: Subject to any disclaimer, the term of this patent is extended or adjusted under 35 U.S.C. 154(b) by 1088 days.

(21) Appl. No.: 11/614,277

(22) Filed: Dec. 21, 2006

(65) Prior Publication Data

US 2008/0155029 A1 Jun. 26, 2008

(51) Int. Cl.
*H04M 11/00* (2006.01)

(52) U.S. Cl. .................................. 379/88.13; 379/88.25

(58) Field of Classification Search .... 379/88.13–88.14, 379/88.12, 88.25, 211.03
See application file for complete search history.

(56) References Cited

U.S. PATENT DOCUMENTS

| | | | |
|---|---|---|---|
| 6,272,214 B1* | 8/2001 | Jonsson | 379/202.01 |
| 6,442,250 B1* | 8/2002 | Troen-Krasnow et al. | 379/93.15 |
| 6,560,318 B1* | 5/2003 | Spielman et al. | 379/88.12 |
| 6,781,962 B1* | 8/2004 | Williams et al. | 370/259 |
| 6,785,245 B1* | 8/2004 | Lee et al. | 370/256 |
| 6,898,274 B1* | 5/2005 | Galt et al. | 379/211.02 |
| 6,950,502 B1* | 9/2005 | Jenkins | 379/88.12 |
| 7,609,663 B2* | 10/2009 | Neuhaus et al. | 370/312 |

* cited by examiner

*Primary Examiner* — Simon Sing

(57) ABSTRACT

Methods and apparatuses for facilitating group messaging to various communication devices are disclosed. A method disclosed includes receiving from an originating user a broadcast message having an address designating at least in part a group of recipients. Next, an intended recipient may be identified based on at least a part of the address. An indication of the broadcast message may then be sent to the intended recipient in accordance with a sending method that is dynamically selected from a set of sending methods associated with the intended recipient based on characteristics associated with the intended recipient.

22 Claims, 8 Drawing Sheets

METHOD AND APPARATUS FOR GROUP MESSAGING

BACKGROUND INFORMATION

A wide variety of means exist for communication between users. For example, a user may conduct phone calls via a home phone, work phone, and mobile phone. In addition, users may also communicate using devices such as PCs, PDAs, pagers, etc., using various means of communicating such as voice, email, short text messaging, and instant messaging.

Unfortunately, sending messages and communicating with devices using such a wide variety of communication means can be difficult. In particular, when a user wishes to send a broadcast message or set up a conference session with a group of users, communication with each user in the group may vary. For example, a group list may be established for each user subscribing to email communication services. However, users subscribing to different communication means (e.g., users who receive messages by phone, short text messaging, or instant messaging) must be contacted separately.

Further, a user in an intended group of broadcast message recipients may have multiple communication devices. Depending on which communication device the broadcast message is sent to, the user may not receive the broadcast message in a timely fashion. Further problems result when the sender of a broadcast message does not automatically receive feedback from the recipients of the message. For example, a sender may request confirmation of receipt from each recipient of a message but some users may forget to respond or may ignore the request.

DETAILED DESCRIPTION OF PREFERRED EMBODIMENTS

Preferred methods and systems may provide a group messaging facility and may enable a single user to easily broadcast a message to a group of users, regardless of the endpoint (e.g., receiving) communication device(s) used by each user in the group. In addition, sending methods for delivering the message to each user may be dynamically selected from a set of sending methods based on characteristics associated with each user. Additional details of such a group messaging facility are described below in connection with FIG. 6. Sending methods may include one or more of dialing a home telephone number, a business telephone number, a cell phone number, a PDA number, instant messaging, an Internet Protocol messaging (for example using HTTP to send XML), emailing, a short text messaging, etc. Broadcast messages may include text, voice, video, data, file attachments, meeting invitations, etc. Preferred methods and systems may also include facilities for automatically establishing conference sessions among members of a contact group. In addition, broadcast messages may include requests for confirmation of receipt and/or confirmation of receipt may be detected automatically.

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention. It is to be understood that other implementations may be utilized and that structural and method changes may be made without departing from the scope of present invention.

Figure 1:
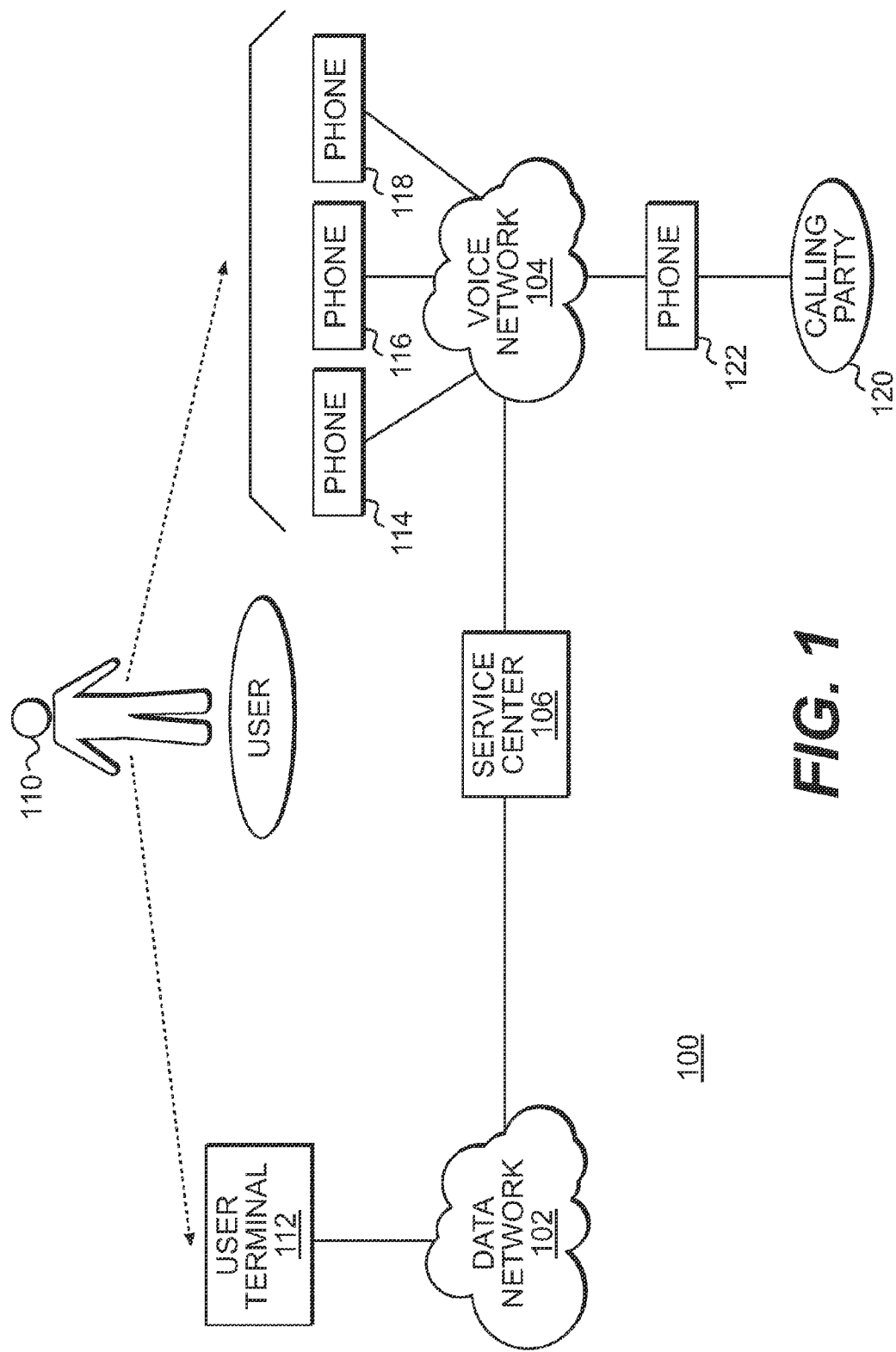
FIG. 1 is a diagram of an exemplary data processing and telecommunications environment.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, firmware, and/or any combination of these structures. Data processing and telecommunications environment 100 may include a data network 102, a voice network 104, and a service center 106. A user 110 may use a user terminal 112 to interface with data network 102 and may use phones 114, 116, and 118 to interface with voice network 104. A calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. Although FIG. 1 shows a single data network 102, those skilled in the art will appreciate that network 102 is only representative in nature and in some implementations may consist of more than one network configuration designed to communicate using various wireless and wireline structures and various protocols. By way of example, data network 102 may be implemented through a wide area network ("WAN"), local area network ("LAN"), an intranet, and/or the Internet. Further, the service center 106 may be connected to multiple data networks 102, such as, for example, a wireless carrier network and the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using Voice-over Internet Protocol ("VoIP") technology. In addition, voice network 104 may be implemented using both PSTN and VoIP technology. Further, service center 106 may be connected to multiple voice networks 104, such as, for example, Verizon'S™ Voice Network, voice networks operated by other carriers, and wireless carrier networks. Although FIG. 1 shows a single voice network 104, network 104 is only representative in nature and in some implementations may consist of more than one network configuration designed to communicate using various wireless and wireline structures and various protocols.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, firmware, and any combination of these structures. For example, service center 106 may be implemented using one or more general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 with an interface to data network 102. For example, user terminal 112 may be implemented using any device capable of accessing the Internet, such as a general purpose computer or personal computer equipped with a modem. Furthermore, user terminal 112 may be implemented in wireless devices, such as pagers, mobile phones (with data access functions), and Personal Digital Assistants ("PDA") with network connections, such as the Blackberry device from Research in Motion and the Treo device from Palm.

User terminal 112 also allows user 110 to communicate with service center 106. For example, user 110 may use instant messaging ("IM") to communicate with service center 106. In addition, user terminal 112 may use various protocols in transmitting and receiving messages, including, for example, the Transmission Control Protocol/Internet Protocol (TCP/IP), the hypertext transfer protocol ("HTTP"), the file transfer protocol ("FTP"); the hypertext markup language ("HTML"); and the extensible markup language ("XML"). Furthermore, a client application may be installed on user terminal 112 to communicate directly with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
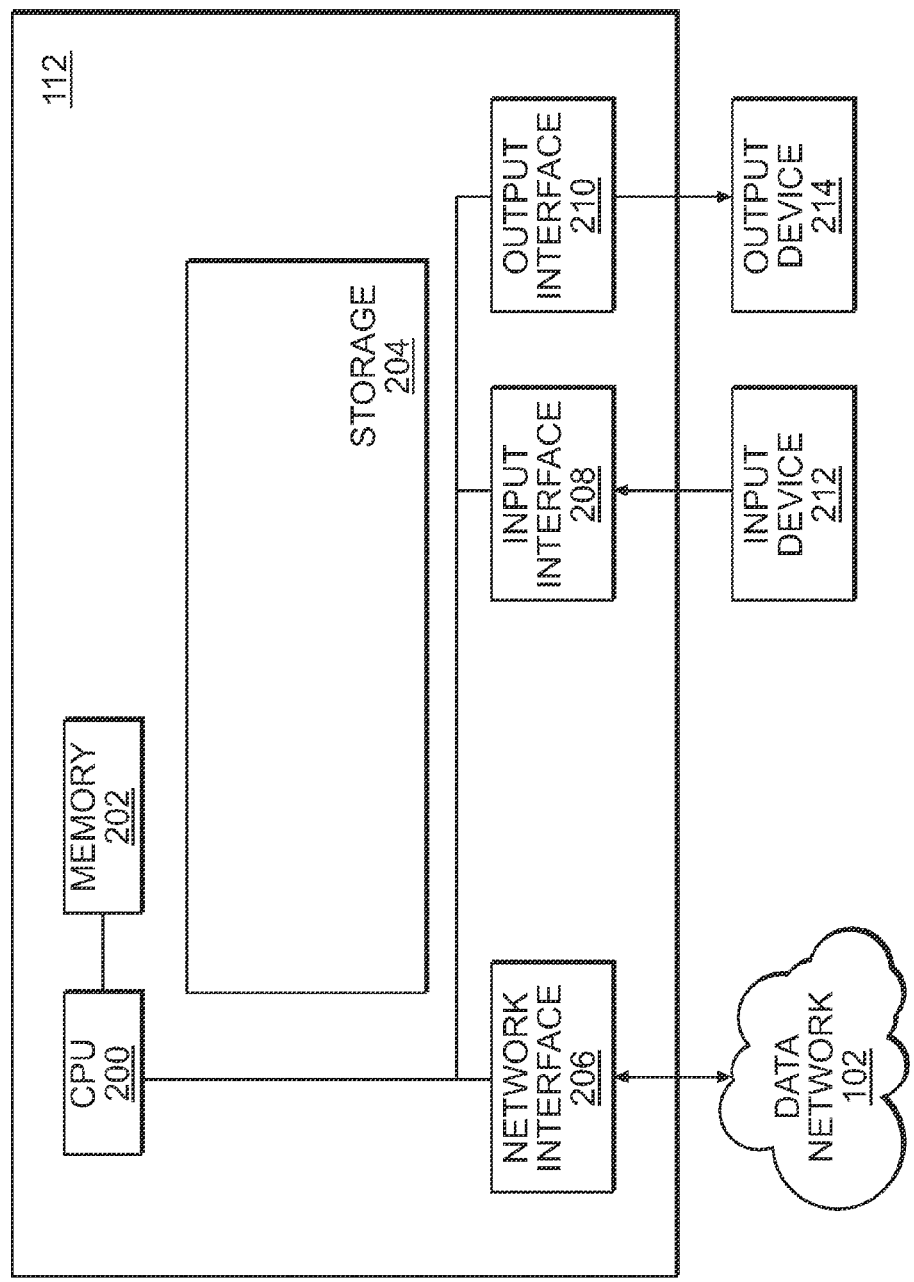
FIG. 2 is a diagram of an exemplary user terminal used in the data processing and telecommunications environment of FIG. 1.

FIG. 2 is a block diagram of a preferred user terminal. User terminal 112 includes a central processing unit ("CPU") 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a coprocessor, memory, registers, and other processing devices and systems as appropriate. CPU 200 may be implemented, for example, using a Pentium™ processor provided by Intel Corporation.

Memory 202 provides a memory for program code for CPU 200. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, a CD ROM drive, a DVD drive, a general-purpose storage device, a removable storage device, and/or other devices capable of storing information. Further, although storage module 204 is shown within user terminal 112, storage module 204 may be external to user terminal 112 yet connected to user terminal 112 using a variety of wired and wireless architectures such as USB, SCSI, etc.

Storage module 204 may include program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service ("MSNMS") client or America Online Instant Messenger ("AIM") client; and an Operating System ("OS"), such as the Windows operating system provided by Microsoft Corporation. In addition, storage module 204 may include other program code and information, such as program code for TCP/IP communications; kernel and device drivers; configuration information, such as a Dynamic Host Configuration Protocol ("DHCP") configuration; a web browser, such as Internet Explorer provided by Microsoft Corporation; and any other software that may be installed on user terminal 112.

Network interface 206 provides a communications interface between user terminal 112 and data network 102. Network interface 206 may receive and transmit communications for user terminal 112. For example, network interface 206 may be a modem or a LAN port.

Input interface 208 receives input from user 110 via input device 212 and provides the input to CPU 200. Input device 212 may include, for example, a keyboard, a microphone, and a mouse. Other types of input devices may also be implemented. Input interface 208 thus constitutes a point at which a user interacts with user terminal 112.

Output interface 210 provides information to user 110 via output device 214. Output device 214 may include, for example, a display, a printer, and a speaker. Other types of output devices may also be implemented. Output interface 210 similarly constitutes a point at which a user interacts with user terminal 112.

Figure 3:
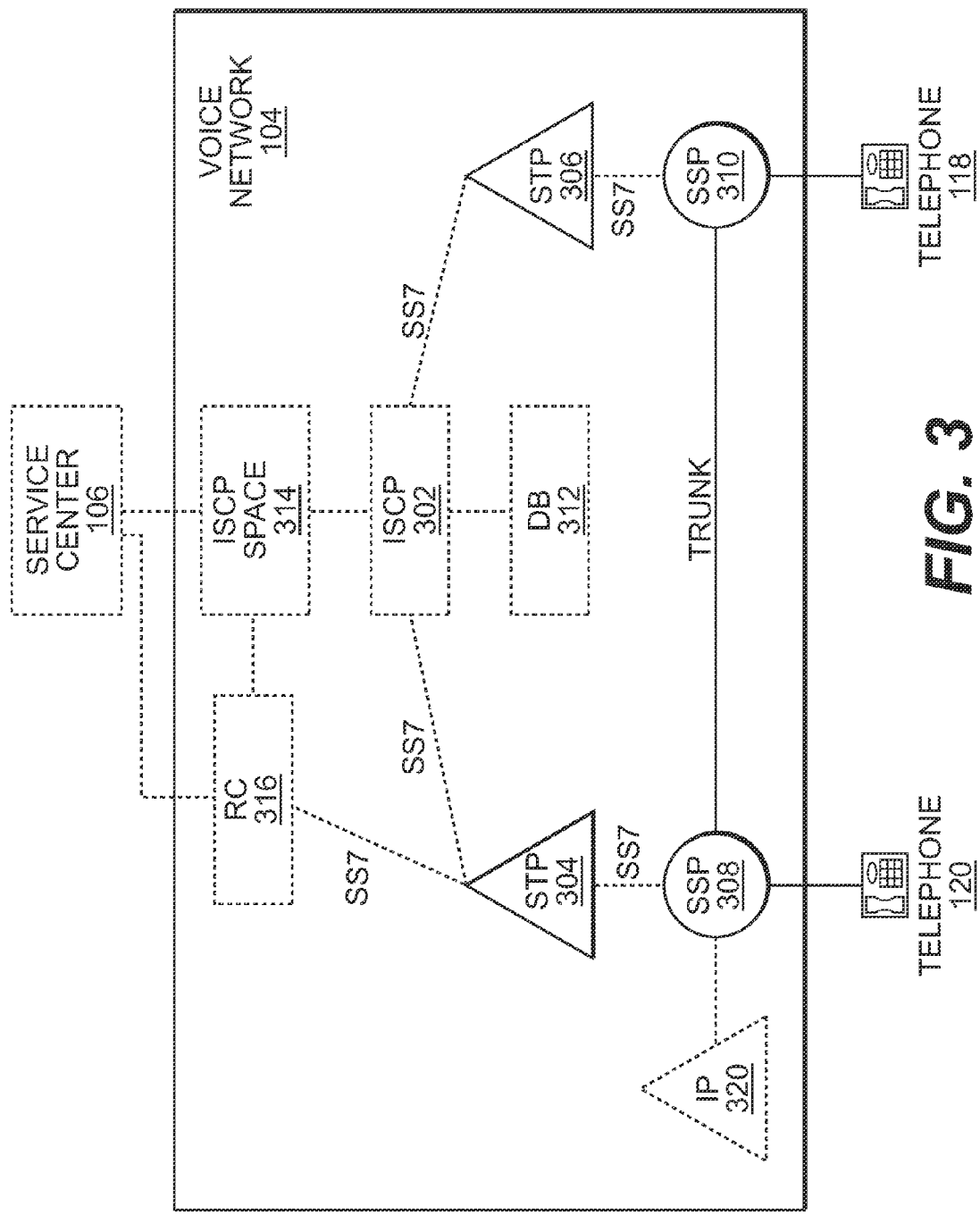
FIG. 3 is a diagram of an exemplary voice network used in the data processing and telecommunications environment of FIG. 1.

FIG. 3 is a diagram of a preferred voice network. As shown, voice network 104 includes an intelligent service control point ("ISCP") 302, service transfer points ("STP") 304 and 306, service switching points ("SSP") 308 and 310, a line information database ("LIDB") 312, an ISCP Service Provisioning and Creation Environment ("SPACE") 314, a Recent Change Engine ("RCE") 316, and an Intelligent Peripheral ("IP") 320.

Voice network 104 may be implemented using the PSTN and SS7 as a signaling protocol. The SS7 protocol allows voice network 104 to provide features, such as call forwarding, caller ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point ("SCP") or an Advanced Intelligent Network ("AIN") SCP. ISCP 302 provides translation and routing services of SS7 messages to support the features of voice network 104, such as call forwarding. In addition, ISCP 302 may exchange information with the service center 106 using TCP/IP, SS7 or other messaging protocol. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STPs 304 and 306 may route SS7 messages between SSPs 308 and 310. STPs 304 and 306 may be implemented using known hardware and software from manufacturers such as NORTEL and LUCENT Technologies.

SSPs 308 and 310 provide an interface between voice network 104 and phone 114 and phone 122, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 (at phone 122) and user 110 (at phone 114). For example, SSPs 308 and 310 may exchange SS7 messages, such as TCAP messages, within message signal units ("MSU") to control calls, perform database queries to LIDB 312, and provide maintenance information.

LIDB 312 comprises one or more known databases to support the features of voice network 104. For example, LIDB 312 may include subscriber information, such as a service profile, name and address, and credit card validation information.

ISCP SPACE 314 may be included as part of ISCP 302 or be separate from ISCP 302. For example, the Telcordia ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more RCEs 316 such as, for example, an Enterprise Recent Change engine (eRC); an Assignment, Activation, and Inventory System ("AAIS"); or a multi-services platform ("MSP"). As an example, the eRC and AAIS may be used in voice networks 104 located in the western part of the United States, while an MSP may be used in networks in the eastern part. The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an AAIS is used for providing updates to ISCPs 302.

Additionally, voice network 104 may include one or more IPs. For example, in FIG. 3, an IP 320 is illustrated as being connected to SSP 308. These IPs may be used for providing services, such as voice mail services.

Figure 4:
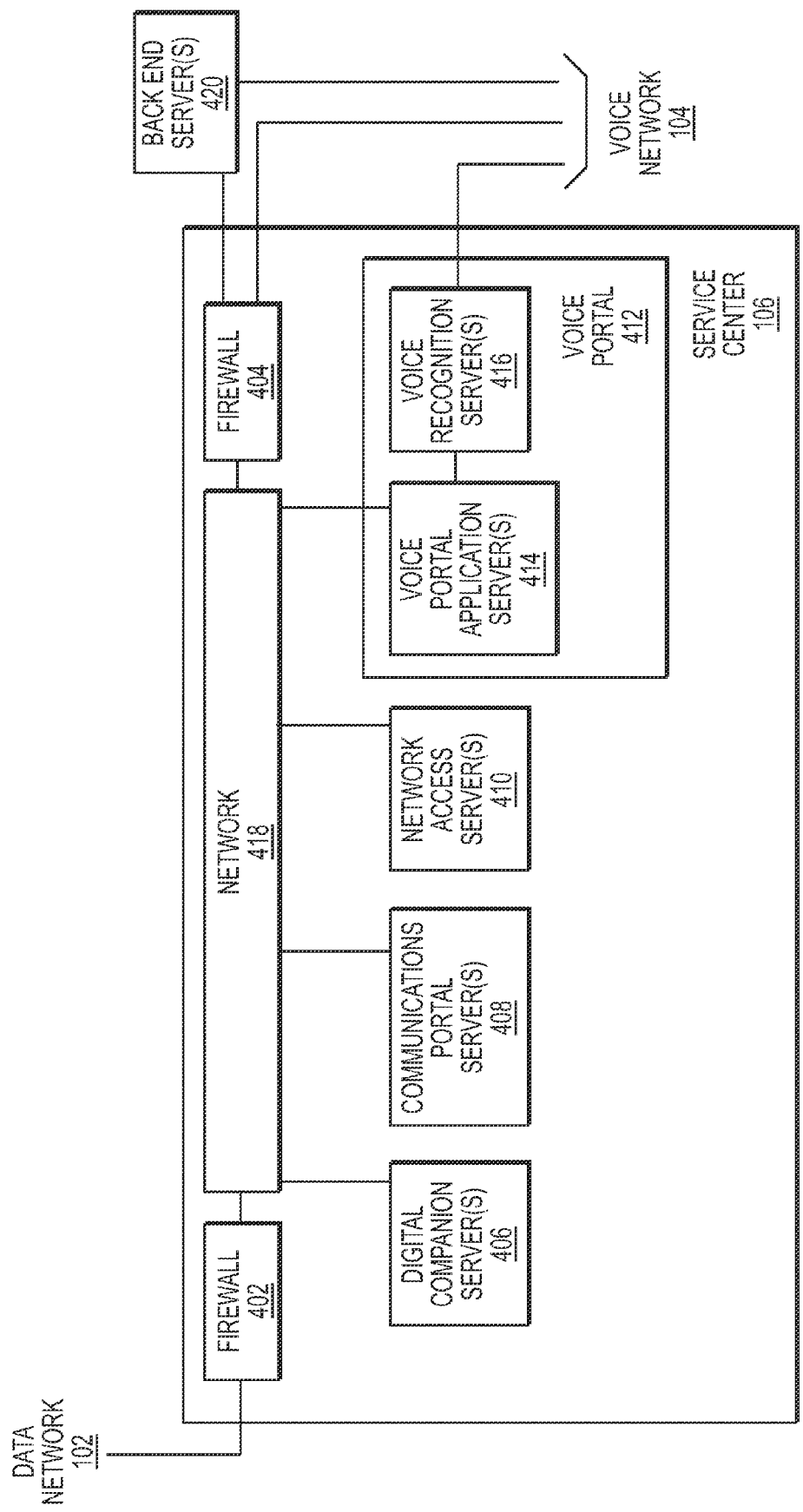
FIG. 4 is a block diagram of an exemplary service center used in the data processing and telecommunications environment of FIG. 1.

FIG. 4 is a block diagram of a preferred service center. As shown, service center 106 may include firewalls 402 and 404, one or more "digital companion" servers 406, one or more communication portal servers 408, one or more network access servers 410, and a voice portal 412. Voice portal 412 may include a voice portal application server(s) 414 and a voice recognition server(s) 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or Fiber Distributed Data Interface ("FDDI") network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, and 420) may be any type of computer, such as a Unix or DOS-based computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling party's number, setting up conference sessions online, etc. Methods and systems of preferred embodiments may leverage digital companion server 406 to perform contact management services.

A communications portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, voice recognition server(s) 416 and voice portal application server(s) 414. Voice recognition server(s) 416 may receive and interpret dictation, or recognize spoken commands. Application server(s) 414 may take, for example, the output from voice recognition server(s) 416, convert it to a format suitable for service center 106, and forward the information to one or more servers (406, 408, and 410) in service center 106.

Figure 5:
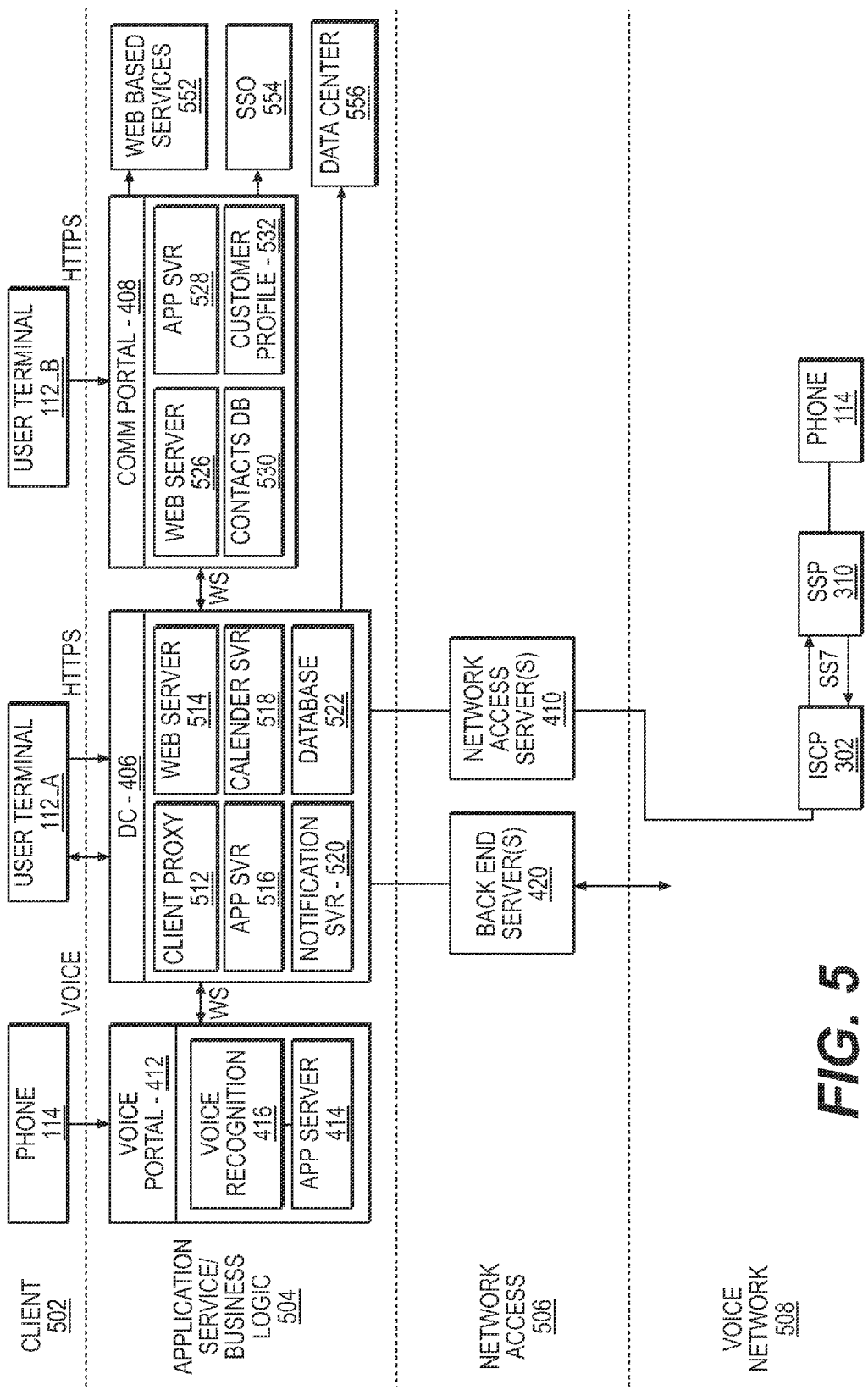
FIG. 5 illustrates a logical architecture of an exemplary data processing and telecommunications system.

FIG. 5 illustrates a logical architecture of a preferred system. As illustrated, the logical architecture may be split into four planes: client side plane 502, application service business logic plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop-type computer running a web browser for communicating with Service Center 106 via the Internet. Additionally, the user may have one or more phones 114, such as, for example, one or more standard landline telephones and/or wireless phones.

Application service business logic plane 504 includes digital companion server(s) 406, communication portal server(s) 408, and voice portal 412. These entities may communicate between one another using, for example, web services or any other suitable protocols. Web services are a standardized way of integrating web-based applications using the XML, Simple Object Access Protocol ("SOAP"), Web Services Description Language ("WSDL") and Universal Description, Discovery and Integration ("UDDI") open standards over an Internet Protocol backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls on-line. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties' number, setting up conference sessions on-line, etc. Application server function 516 may facilitate one or more contact management functions.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information usable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as, for example, CD-ROMs, DVDs, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 514 of the digital companion servers, provides functionality for receiving traffic over data network 102 from a customer. For example, the web server may be a standard web server that a customer may access using a web browser, such as Internet Explorer.

Application server function 528 encompasses the general functions performed by communication portal servers 408. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the "superpages.com" website. Application server function 528 could then contact these external services 552 to retrieve information, such as an address for a person in the user's address book.

In another example, application server function 528 of communication portal 408 may interface a single sign on ("SSO") server 554. SSO 554 may be used to allow users to access all services to which the user subscribes, on the basis of a single authentication that is performed when they initially access the network.

Contacts database 530 may include storage devices for storing an address book for the user. This address book may be any type of address book. For example, the user's address book may include the names, phone numbers, and addresses of people and/or organizations. Contacts database 530 may also include group addresses identifying members of a particular group (e.g., "Friends"). The storage devices in contacts database 530 may be internal or external to communication portal servers 408 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services business logic plane 504 of the architecture may include a voice portal 412. As discussed above, voice portal 412 may include, for example, a voice recognition server(s) 416 and an application server(s) 414, and may be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server(s) 414 of voice portal 412 may include hardware and/or software for exchanging information between digital companion servers 406 and voice recognition server(s) 416 or between communication portal servers 408 and voice recognition server(s) 416. Additionally, application server(s) 414 may be included on a separate server, included in the hardware and software providing voice recognition server(s) 416, included in digital companion servers 406, etc.

Network access plane 506 of the architecture includes the functions for providing connectivity between application service business logic plane 502 and voice network 104. For example, this plane may include network access servers 410 and/or back end servers 420.

Network access servers 410 may be included in the service center 106 and may provide the hardware and software for sending and receiving information to voice network 104 in processing the applications provided by the service center. For example, network access servers 410 may include a caller ID ("CID") functionality for retrieving caller ID information from voice network 104, a click to dial ("CTD") functionality for instructing an IP in the voice network to place a call via an SSP, and/or a real-time call management ("RTCM") functionality for interfacing with an ISCP of the voice network.

Network access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway ("RDA Gateway") of voice network 104. An RDA Gateway is a device for issuing requests to a Data Operations Center ("DOC") of voice network 104 for name and/or address information associated with a phone number and receiving the name and/or phone number in response to this request.

In another example, back end server(s) 420 may include a wireless Internet gateway that is used for interfacing with a mobile switching center ("MSC") of a wireless voice network. As with the above-described back end server(s) 420, this wireless Internet gateway may be used for converting requests and information between the formats used by service center 106 and those used by the wireless voice network.

In yet another example, back end server(s) 420 may include a conference blasting server for instructing a conference bridge in voice network 104 to dial out via an SSP to the participants of a voice conference. Or, for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward through the conference.

In yet another example, back end server(s) 420 may include a Single Number Short Message Service ("SN SMS") server for interfacing the service center 106 with a SMS gateway in voice network 104. This may be used, for example, to permit the customer to have SMS messages addressed to their home phone number directed to an SMS capable device of the users choosing.

Voice network plane 508 includes the hardware and software included in voice network 104, as discussed above with reference to FIG. 3. For example, voice network plane 508 may include ISCP 302, IPs 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may coexist or be distributed among several geographically dispersed locations.

Figure 6:
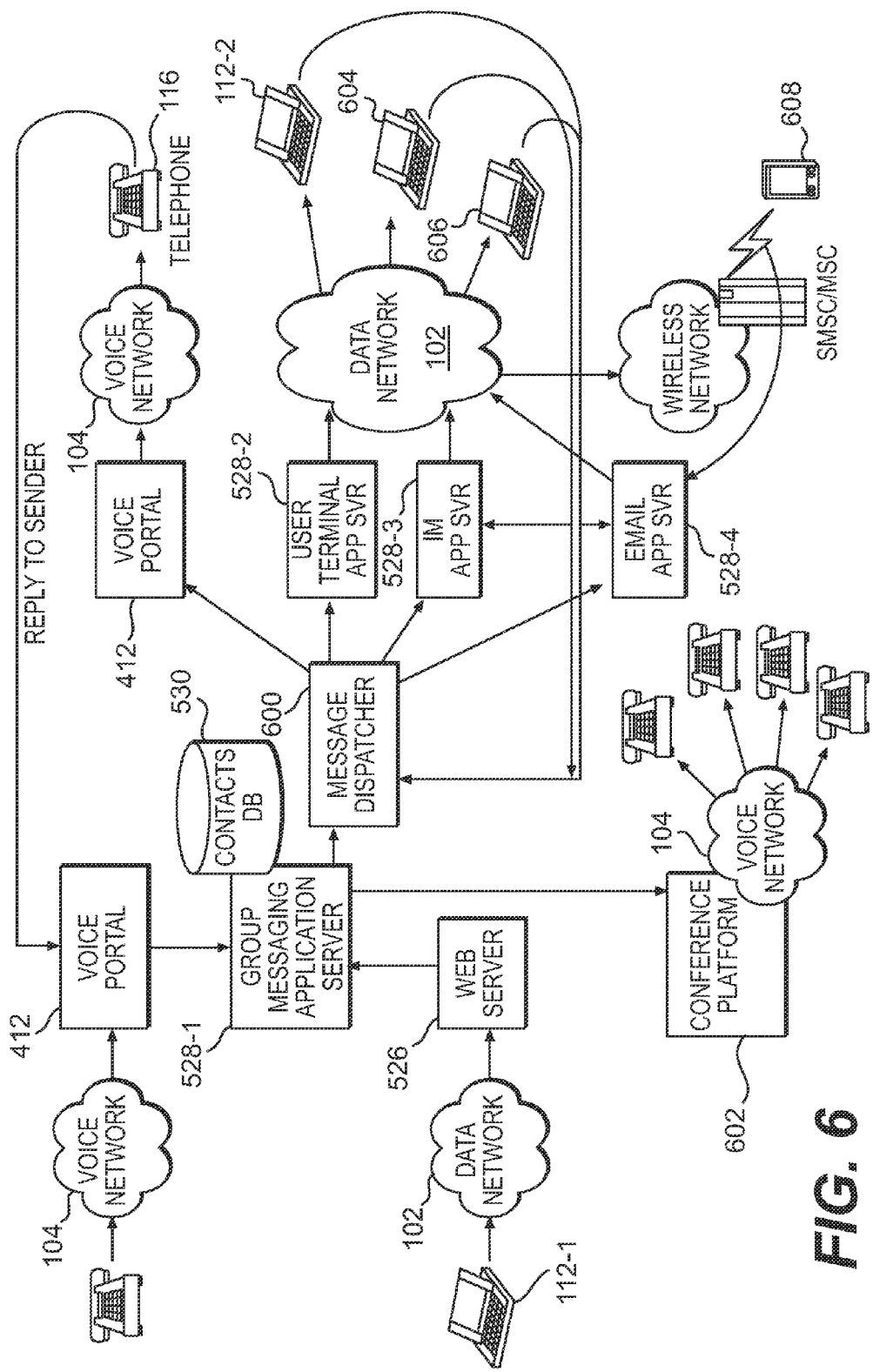
FIG. 6 illustrates an exemplary group messaging architecture.

FIG. 6 diagrammatically illustrates an overview of a preferred group messaging architecture. As illustrated, the exemplary group messaging architecture may include voice portal 412, which is adapted to interface with telephones 114 and 116 via voice network 104; various communication servers 526, 528-1, 528-2, 528-3, and 528-4, which are adapted to interface with endpoint communication devices, such as user terminal 112-2, via data network 102; contacts database 530, which stores and maintains contact information; and a message dispatcher 600, which is adapted to perform various group messaging functions. Communication servers may include web server 526, which is adapted to interface with a user terminal 112-1 via data network 102; a group messaging application server 528-1, which is adapted to interface with voice portal 412, web server 526, and a conference platform 602; a user terminal application server 528-2, an instant messaging application server 528-3 (e.g., a BOT server), and an email application server 528-4, each of which are adapted to interface with corresponding endpoint communication devices, such as user terminal 112-2, an IM device 604, an email device 606, and an SMS device 608.

Figure 7A:
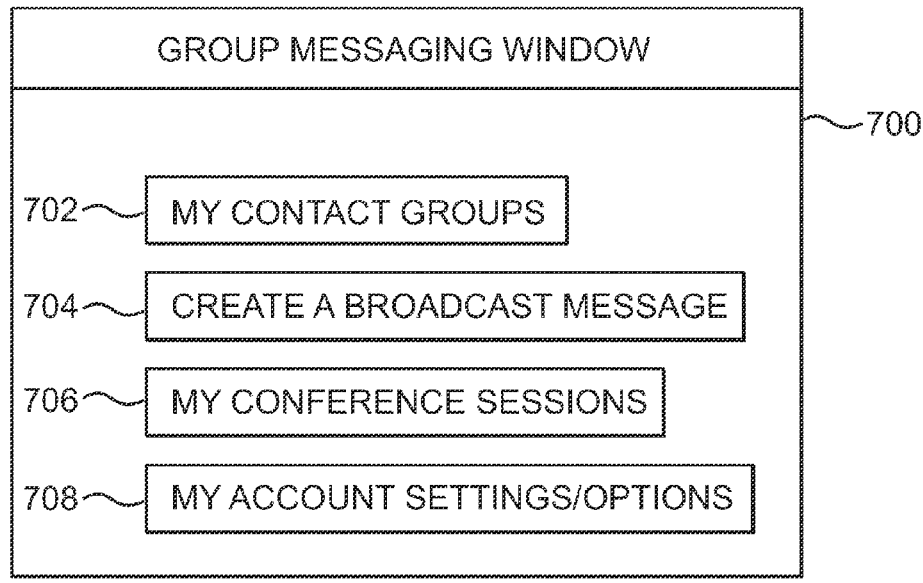
FIGS. 7A and 7B depict exemplary interfaces presented by a group messaging service.

FIG. 7A depicts an exemplary menu 700 which users may access to generate a voice message or a text message (i.e., a broadcast message) to be broadcast to a contact group. For example, a broadcasting or originating user may access menu 700 via a web interface via user terminal 112-1 or similar device to compose and send broadcast messages. The web interface may include a login page to authenticate users subscribing to the group messaging service. Programs or processors residing in web server 526 and/or group messaging application server 528-1 may present menu 700, which may present various options 702-710 to the broadcasting user. A first option 702 on menu 700 may include creating or modifying contact groups. By selecting first option 702 a user may select contacts from an address book in contacts database 530 to add to a new or existing contact group. A user may also create or modify a name assigned to a contact group (e.g., john.doe_myCloseFriends@alerts.verizon.net). Alternatively, a name for a contact group may be automatically generated based on user input.

Figure 7B:
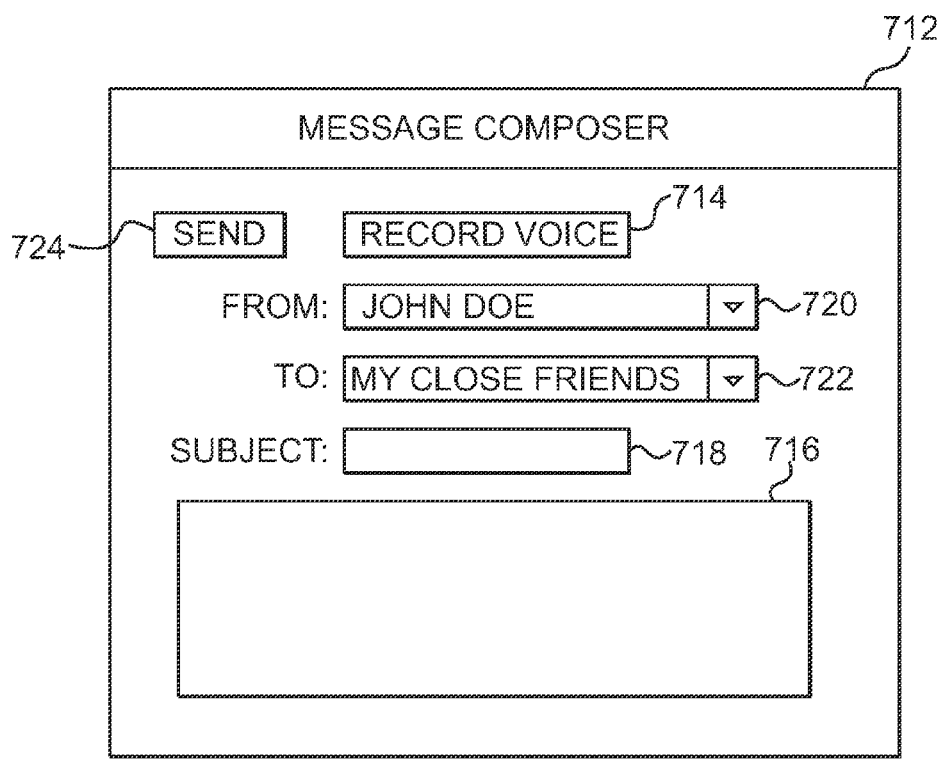

FIG. 7B depicts an exemplary message composing interface 712 that may be presented when a second option 704 on menu 700 is selected. Message composing window 712 may enable a user to create and send a message to every member in a contact group. The message may be composed as a voice message, by selecting record voice button 714, a video message by selecting record video button 715, and/or a text message, by entering text in text field 716. If a text message is broadcast to one or more endpoint devices that have only voice capability (e.g., telephones with no text capability), a Text to Speech ("TTS") synthesizer in voice portal 412 may perform the required conversion of text to speech. In addition, the broadcasting user may be permitted and/or prompted to include a subject for the message (e.g., a topic for a meeting) in a "Subject" field 718. A limit on a number of text characters (or recordable audio/video time) may be imposed and the broadcasting user may be notified of how many characters (or recordable audio/video time) are remaining during the composition process. Message composing window 712 may also permit the broadcasting user to select a recently sent message by clicking on a designated hyperlink or menu option (not shown).

A name associated with the broadcasting user may be entered in a "From" field 720 or the broadcasting user may be permitted to select another "From" name from a drop down list or address book interface (not shown). Group messaging application server 528-1 may validate the broadcasting sender (i.e., "From" field) associated with the broadcast message.

A contact group and additional message recipients (e.g., individual contacts and/or multiple contact groups) may be entered in a "To" field 722 or may be selected from a drop down list or address book interface (not shown). When creating or modifying a contact group, an email-type address may be assigned to the contact group (e.g., john.doe_myCloseFriends@alerts.verizon.net) and/or a display name (e.g., My Close Friends) to be recognized as corresponding to the contact group. A contact group may include universal addresses for one or more intended recipients. The term universal address refers, for example, to an address that maps to all or a portion of all telephonic and/or electronic (e.g., email, PDA, short text message, etc.) addresses associated with a recipient. A universal address may be associated with each member subscribing to a universal address service. It may be designated using various schemes or formats (e.g., a telephone number, an email address, an instant messaging address, a short text messaging address, etc.). For example, an email type universal addressing scheme (e.g., john.doe@alerts.verizon.net) may be recognized at group messaging application server 528-1 or at message dispatcher 600 as a universal address. Thus, all (or a portion of all) addresses associated with contact "john doe," including email addresses, SMS addresses, Instant Message addresses, voice numbers, etc., may be accessed via a single universal address (e.g., john.doe@alerts.verizon.net). Universal addresses may thus facilitate delivery of messages sent to a contact group because members of the group may receive the message or an indication of how to retrieve the message at one or more endpoint devices. In certain preferred embodiments, a subscribing user may select and/or service center 106 may dynamically (e.g., automatically and in real time) determine one or more preferred communication devices to receive broadcast messages sent using the user's universal address.

For example, user preferences may specify a priority associated with the various devices associated with the user for purposes of receiving group messaging. The user preferences may indicate different priorities associated with the various devices at different times, for example different times of the day, different days of the week. The priorities may have user-defined defaults and the user may be able to change the priorities from the defaults, for example if the user will be traveling and would like to have a higher priority for a cell phone than for a home phone. The priorities may be used to determine which devices to determine status for first. The system may monitor usage patterns for a user in order to infer priorities for a given user based on the times at which a user tends to use a particular device. For example, if a user always uses a cell phone between 1 and 5 pm, the system may infer that the cell phone should have higher priority at those times. The system may also use information about recently used devices to infer priorities. For example, if a user has recently used a particular device within a predefined time frame, the system could infer that the recently used device should be given higher priority. The user preferences may be reflected in contact information associated with the user.

Additionally, the system may determine a status of the user's associated devices (e.g., online, offline, busy, out-of-range, do-not-disturb, recently used, etc.), and deliver the group message accordingly.

In composing a broadcast message, group messaging application server 528-1 and/or voice portal 412 may format the broadcasting user's text, video and/or voice message as an electronic message (e.g., a Simple Mail Transfer Protocol ("SMTP") email message). User entries in message composing interface 712 may also be converted into another format, such as an XML document, to facilitate transfer and appropriate delivery of the broadcast message by message dispatcher 600. In addition, programs or processors residing in web server 526 and/or group messaging application server 528-1 may automatically exclude the broadcasting user from the message recipients even if the broadcasting user is a member of one or more of the selected contact groups. The finalized broadcast message may be sent to message dispatcher 600 using send button 724 for broadcasting and a confirmation of successful transmission to message dispatcher 600 may be sent to the broadcasting user.

Message dispatcher 600 may receive the broadcast message and may send a request (e.g., an HTTP GET request for XML data or SOAP request) to group messaging application server 528-1. Group messaging application server 528-1 may respond to the request by extracting telephone numbers and/or contact addresses from contacts database 530 and sending the contact information on to message dispatcher 600. In the case of a voice broadcast message, message dispatcher 600 may extract and save the voice message in a ".wav" file. In the case of a video broadcast message, message dispatcher 600 may convert the video data into a supported video format (e.g., MPEG-4) and save the video. Message dispatcher 600 may also add text to the broadcast message for specific endpoint devices (e.g., a brief indication of how to retrieve the message), as required. Based on the contact information received from group messaging application server 528-1, message dispatcher 600 may automatically determine a broadcast message sending method. For example, message dispatcher 600 may parse endpoint device contact information associated with the universal address (e.g., phone numbers, IM addresses, email addresses, SMS addresses, etc., IP addresses), determine any priority or status information associated with these devices, and determine an appropriate message format based on the selected delivery device, thereby determining to which servers or portals to dispatch the broadcast message. For example, if the endpoint device contact information includes an IP address, the message format could be XML, and the broadcast message sending method could include sending an HTTP XML message over IP.

When a broadcast message is sent to telephone 116 via voice portal 412, telephone 116 may indicate receipt of the message to an associated user with a predetermined ring tone. When an associated user picks up, voice portal 412 may play a recorded voice message or a TTS-synthesized message. If the broadcast message is sent to user terminal 112-2, user terminal 112-2 may display a pop-up window showing and/or playing the broadcast message or an indication of how to retrieve the broadcast message. If the broadcast message is sent to IM device 604, IM device 604 may display a similar pop-up window. If the broadcast message is sent to email device 606, email application server 528-4 may send an email including the broadcast message in the body of the email or as an attachment (e.g., a wav file for voice). If the broadcast message is sent to SMS device 608, a Short Message Service Center ("SMSC") may cause SMS device 608 to beep or otherwise indicate receipt of a short text message. The short text message received at SMS device 608 may be the complete broadcast message or may include only the first 160 characters of the broadcast message and an indication of how to retrieve the remainder of the message. The broadcast message or indication of the broadcast message (e.g., pop-up window, short text message, or speech recording) may also include information regarding a conference session.

For each endpoint device that receives a broadcast message, a reply from each recipient may also be requested. For example, the reply may be in the form of a message composed by the recipient and sent to the broadcasting user confirming receipt of the broadcast message. The message may consist of a designated key pressed by the recipient (e.g., press 1 to confirm receipt) or a hyperlink clicked on by the recipient (e.g., click ok to confirm receipt). In addition or alternatively, the voice of an intended recipient may be automatically recognized and/or authenticated by voice recognition server 416 to confirm receipt. In the case of user terminal 112-2 or email device 606, the reply may be an SMTP email sent to message dispatcher 600 and message dispatcher 600 may forward the reply on to the broadcasting user.

Likewise, each broadcast message may include a capability to reroute the message to an alternate device. For example, the message may provide the capability to select a user device to which to forward the message. In the case of a message delivered via email or IM, this may be accomplished using an inserted set of hyperlinks or forwarding addresses. In the case of a message delivered via telephone, this may be accomplished by allowing the user to using dialing keys to select a forwarding location (e.g., "press 1 to send to email," etc.).

A third option 706 on menu 700 of FIG. 7A may be for scheduling or establishing a conference session (e.g., a chat session or telephone conference call) in a contact group. After selecting third option 706, a broadcasting user may be presented with an interface for selecting a meeting time, topic, call in number, password, contact group, and/or an introductory message. The introductory message may also be generated automatically based on other entries (e.g., meeting time, topic, etc.). The interface may also list all conference sessions established by a currently logged in user. Hyperlinks associated with each conference session may enable the user to automatically join a listed conference.

A conference invitation may be broadcast is a manner similar to that of a broadcast message. When a conference invitation is broadcast a recipient user's reply may indicate acceptance of the invitation by pressing a key on a keypad or clicking on a button or hyperlink. For example, a user receiving the invitation via telephone 116 may hear a message, such as, "Press 1 to join or 2 if you cannot join." In response to the user's acceptance of the invitation, group messaging application server 528-1 may automatically transfer the user's associated communication device to conference platform 602. In the case of telephone 116, voice portal 412 may automatically dial out to conference platform 602 and transfer the recipient user's call to conference platform 602. In the case of SMS device 608, a bridge number may be included in the SMS message whereby the recipient user may call into the conference bridge. If a user declines the invitation, appropriate details and instructions for joining the conference session at a later time may be provided. In certain preferred embodiments, conference platform 602 may be configured to receive a list of conference participants from group messaging application server 528-1 and dial out to each participant.

Finally, a fourth option 708 on menu 700 of FIG. 7A may permit users subscribing to the group messaging service to change account profile settings, such as passwords, PINs, and display names. For example, an interface presented by selecting fourth option 708 may provide options for a broadcasting user to create and designate different display names to appear in the "From" field of a message depending on which group or groups the message is sent to.

Instead of accessing menu 700 shown in FIG. 7A, a broadcasting user may also access a voice interface including options corresponding to those of menu 700. A predetermined phone number (e.g., a toll-free number) or a star code may provide access to the voice interface via telephone 114. Programs or processors residing in voice portal 412 and/or group messaging application server 528-1 may prompt the broadcasting user to compose and send a broadcast message. For example, voice portal 412 may include a TTS synthesizer that utters names of contact groups (e.g., group addresses) stored in contacts database 530 and offers the broadcasting user an opportunity to select a contact group by pressing a particular key. The TTS synthesizer may state, "Press 1 to select the group 'Friends.'" Alternatively, or in addition, the broadcasting user may speak the name of a contact group and voice recognition server 416 may recognize the broadcasting user's utterance. In one exemplary embodiment, a broadcasting user may also designate a default contact group to receive broadcasting messages. In that case, the broadcasting subscriber may select a contact group other than the default contact group by pressing a key or speaking the name of a contact group.

Voice portal 412 may prompt the broadcasting user to compose a broadcast message. If a time limit is imposed on the message's duration an audible warning signal may prompt the broadcasting user when the time limit is about to be reached. The broadcasting user may stop recording by pressing a designated key and/or recording may automatically stop after a predetermined time period.

Figure 8:
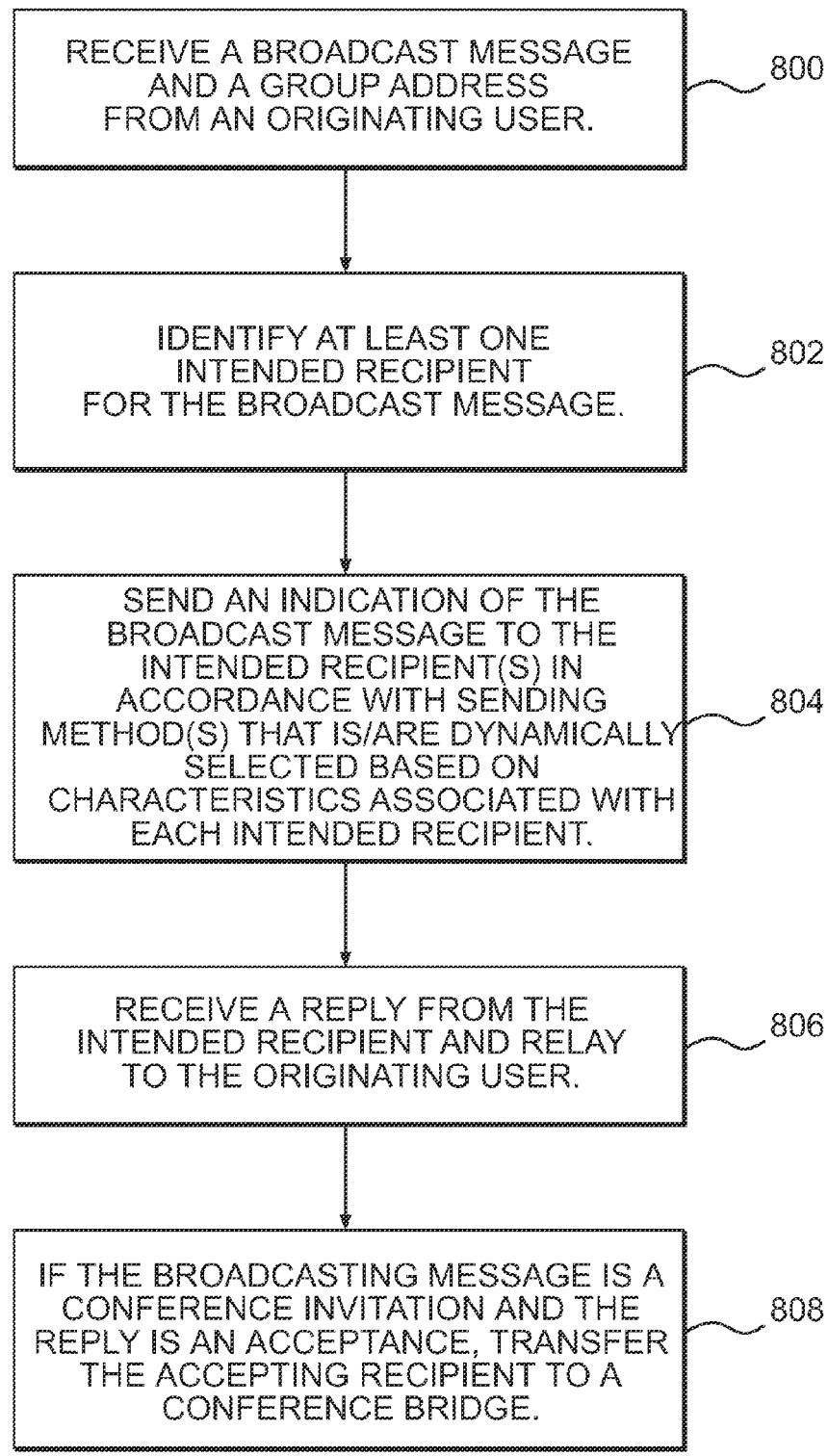
FIG. 8 is a flowchart depicting stages of an exemplary group messaging method.

FIG. 8 is a flowchart depicting stages in a preferred group messaging process. The group messaging process may begin with receiving a broadcast message and a group address (i.e., a contact group) from a broadcasting or originating user (stage 800). One or more intended recipients may be identified based on at least a part of the group address (stage 802). For example, the group address may include universal addresses associated with each intended recipient in the contact group. Endpoint (i.e., destination) terminal addresses for each receiving user may be determined from the universal addresses associated with each recipient. Next, an indication or notification of the broadcast message may be sent to the recipients in accordance with one or more sending methods corresponding to each recipient. The sending method for an intended recipient may be dynamically selected from a set of sending methods associated with the intended recipient based on characteristics associated with the intended recipient, for example from contact information associated with the intended recipient (stage 804). A reply may be received from one or more recipients and may be relayed to the broadcasting user (stage 806). If the broadcasting message is an invitation to a conference and the reply is an acceptance, the recipient sending the reply may automatically be transferred to a conference platform or bridge (stage 808).

The stages illustrated in FIG. 8 are consistent with exemplary implementations of the invention. It should be understood that the sequence of events described in FIG. 8 are exemplary and not intended to be limiting. Thus, other method steps may be used, and even with the methods depicted in FIG. 8, the particular order of events may vary without departing from the scope of the present invention. Moreover, certain stages may not be present and additional steps may be implemented in the processes illustrated in FIG. 8. For example, the illustrated processes may include additional stages corresponding to a user setting preferences and/or parameters associated with aspects of group messaging, e.g., preferences that specify a preferred endpoint device for receiving group messages.

Embodiments consistent with the invention may be implemented in various environments. Further, the processes described herein are not inherently related to any particular apparatus and may be implemented by any suitable combination of components. For example, although message dispatcher 600 is shown separate from group messaging application server 528-1, it can be combined into one server. Moreover, functions in message dispatcher 600 and group messaging application server 528-1 may be combined in one or more apparatuses, such as user terminal 112. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention.

In the preceding specification, the preferred embodiments have been described with reference to the accompanying drawings. It will, however, be evident that various modifications and changes may be made thereunto without departing from the broader scope of the invention as set forth in the claims that follow. The specification and drawings are accordingly to be regarded in an illustrative rather than restrictive sense.

What is claimed is:

1. A method comprising:
    receiving from an originating user a broadcast message having an address designating at least in part a group of recipients;
    identifying an intended recipient for the broadcast message from the group based on at least a part of the address;
    storing a priority of devices associated with the intended recipient;
    determining a status of at least one of the devices associated with the intended recipient prior to sending the broadcast message, the status comprising one of online, offline, busy, and out-of-range;
    determining a destination device associated with the intended recipient based on the priority, the status, and at least one characteristic associated with such intended recipient;
    determining a device type of the determined destination device; and sending the broadcast message to the destination device of the intended recipient in accordance with a sending method that is associated with the determined destination device type, the broadcast message including information usable to reroute to an alternate device in accordance with a sending method that is associated with a device type of the alternate device.

2. The method of claim 1, wherein the characteristic associated with the intended recipient include at least one of preferences selected by the intended recipient, a usage pattern of the intended recipient, or information about devices recently used by the intended recipient.

3. The method of claim 1, wherein the set of sending methods includes at least one of:
   a telephone call method;
   an Instant Messaging messaging method;
   a hypertext transfer protocol messaging method;
   an emailing method; or
   a short text messaging method.

4. The method of claim 3, wherein the broadcast message includes text and the telephone call method includes converting the text to voice.

5. The method of claim 3, wherein the broadcast message includes voice data and sending includes converting the voice to text.

6. The method of claim 1, wherein the broadcast message includes at least one of voice data, video data, or text data.

7. The method of claim 1, further including:
   receiving a reply to the broadcast message; and
   relaying the reply to the originating user.

8. The method of claim 7, wherein the reply to the broadcast message includes a confirmation that the broadcast message was received.

9. The method of claim 1, wherein the broadcast message includes an invitation to a conference.

10. The method of claim 9, further including:
    receiving a reply to the invitation from the intended recipient; and
    transferring the intended recipient to a conference bridge.

11. A computer-readable medium storing instructions executable to perform the method of claim 1.

12. An apparatus comprising:
    a receiver adapted to receive from an originating user a broadcast message having an address designating at least in part a group of recipients;
    a processor adapted to identify an intended recipient for the broadcast message from the group based on at least a part of the address;
    a memory for storing a priority of devices associated with the intended recipient;
    a processor adapted to determine a status of at least one of the devices associated with the intended recipient prior to sending the broadcast message, the status comprising one of online, offline, busy, and out-of-range;
    a processor adapted to determine a destination device associated with the intended recipient based on the priority, the status, and at least one characteristic associated with such intended recipient;
    a processor adapted to determine a device type of the determined destination device; and
    a transmitter adapted to send the broadcast message to the destination device of the intended recipient in accordance with a sending method that is associated with the determined destination device type, the broadcast message including information usable to reroute to an alternate device in accordance with a sending method that is associated with a device type of the alternate device.

13. The apparatus of claim 12, wherein the characteristic associated with the intended recipient include at least one of preferences selected by the intended recipient, a usage pattern of the intended recipient, or information about devices recently used by the intended recipient.

14. The apparatus of claim 12, wherein sending includes at least one of:
    a telephone call method;
    an Instant Messaging messaging method;
    a hypertext transfer protocol messaging method;
    an emailing method; or
    a short text messaging method.

15. The apparatus of claim 12, wherein the broadcast message includes at least one of voice data, video data, or text data.

16. The apparatus of claim 12, wherein:
    the receiver is further adapted to receive a reply to the broadcast message; and
    the transmitter is further adapted to relay the reply to the originating user.

17. The apparatus of claim 16, wherein the reply to the broadcast message includes a confirmation that the broadcast message was received.

18. The apparatus of claim 12, wherein:
    the broadcast message includes an invitation to a conference,
    the receiver is further adapted to receive a reply to the invitation from the intended recipient, and
    the processor is further adapted to transfer the intended recipient to a conference bridge.

19. A system comprising:
    a service comprising:
    a receiver adapted to receive from an originating user a broadcast message having an address designating at least in part a group of recipients,
    a processor adapted to identify an intended recipient for the broadcast message from the group based on at least a part of the address,
    a processor adapted to determine a priority of devices associated with the intended recipient,
    a processor adapted to determine a status of at least one of the devices associated with the intended recipient prior to sending the broadcast message, the status comprising one of online, offline, busy, and out-of-range,
    a processor adapted to determine a destination device from the devices associated with the intended recipient based on the priority, the status, and at least one characteristic associated with such intended recipient,
    a processor adapted to determine a device type of the determined destination device,
    a processor adapted to convert the broadcast message into an appropriate format for the destination device of the intended recipient, and
    a transmitter adapted to send the broadcast message to the destination device of the intended recipient in accordance with sending associated with the determined destination device type, the broadcast message including information usable to reroute to an alternate device in accordance with a sending method that is associated with a device type of the alternate device; and
    a user device comprising:
    a display adapted to display to the originating user an interface for composing the broadcast message,
    an input device adapted to receive a first input from the originating user, the first input including the broadcast message in video, voice, or text format, an input device adapted to receive a second input from the originating user, the second input identifying the group of recipients, a processor adapted to format the broadcast message for transmitting based on the first and second input, and a transmitter adapted to send the broadcast message to the server.

20. A method comprising:

receiving from an originating user a voice message and at least one indication associated with one or more intended recipients;

storing the voice message;

determining a priority of devices associated with an intended recipient;

determining a status of at least one of the devices associated with the intended recipient prior to sending a text message, the status comprising one of online, offline, busy, and out-of-range;

determining a destination device for the intended recipient based on the priority, the status, and the indication, wherein the destination device is capable of receiving a short text messaging (SMS);

sending a text message to the intended recipient at the determined destination device, the text message in the form of an SMS message and including an indication of how to retrieve the voice message, the text message including information usable to reroute to an alternate device in accordance with a sending method that is associated with a device type of the alternate device;

receiving a request to obtain the voice message from the destination device; and providing the voice message to the destination device.

21. The method of claim 20, further comprising:

sending a second text message to the originating user indicating that the intended recipient has received the voice message.

22. The method of claim 20, wherein receiving from an originating user the voice message includes:

receiving a call from the originating user at a system associated with a predetermined phone number, the system including a voice interface having at least one of speech recognition facilities and text-to-speech facilities;

prompting the originating user to provide the at least one indication associated with one or more intended recipients;

prompting the originating user to provide the voice message; and receiving the voice message from the originating user as voice data.

* * * * *